W. S. PERRY.
HEADLIGHT DIMMER.
APPLICATION FILED JULY 13, 1914.
1,219,583.
Patented Mar. 20, 1917.
2 SHEETS—SHEET 1.
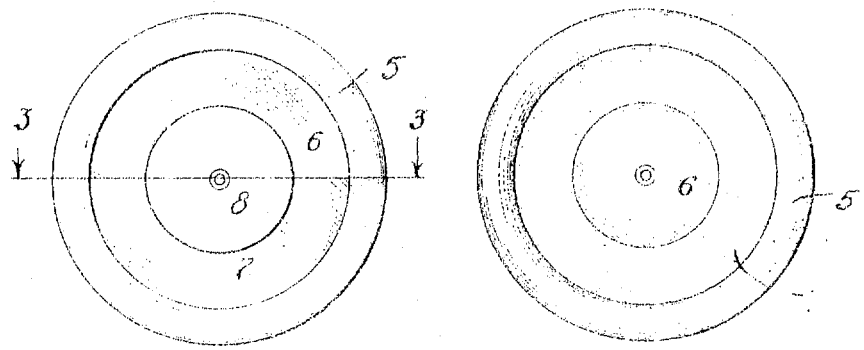
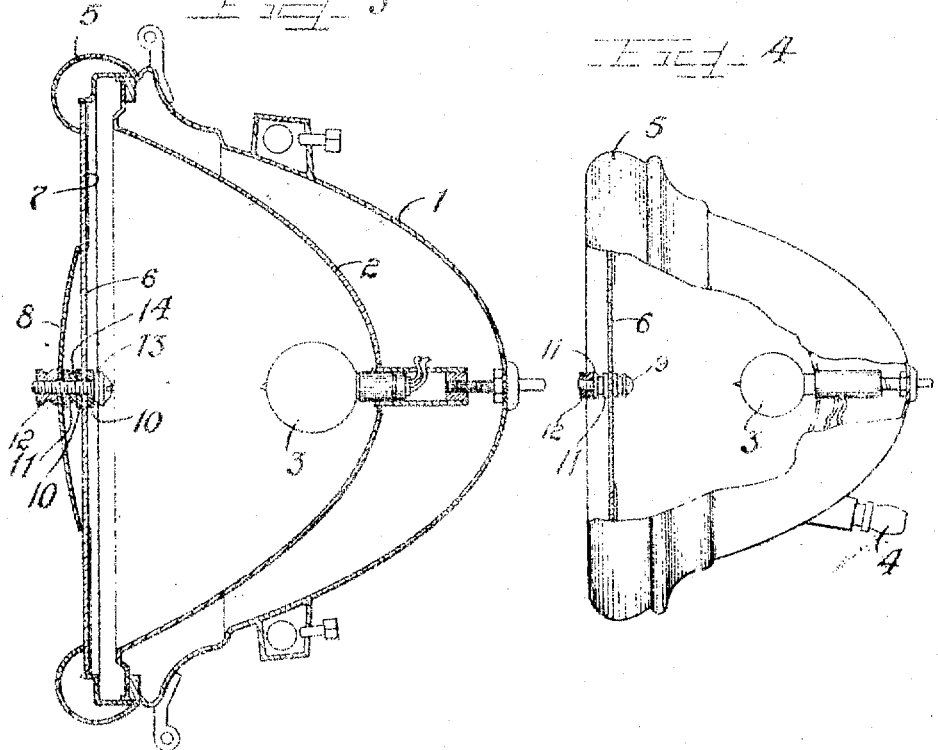

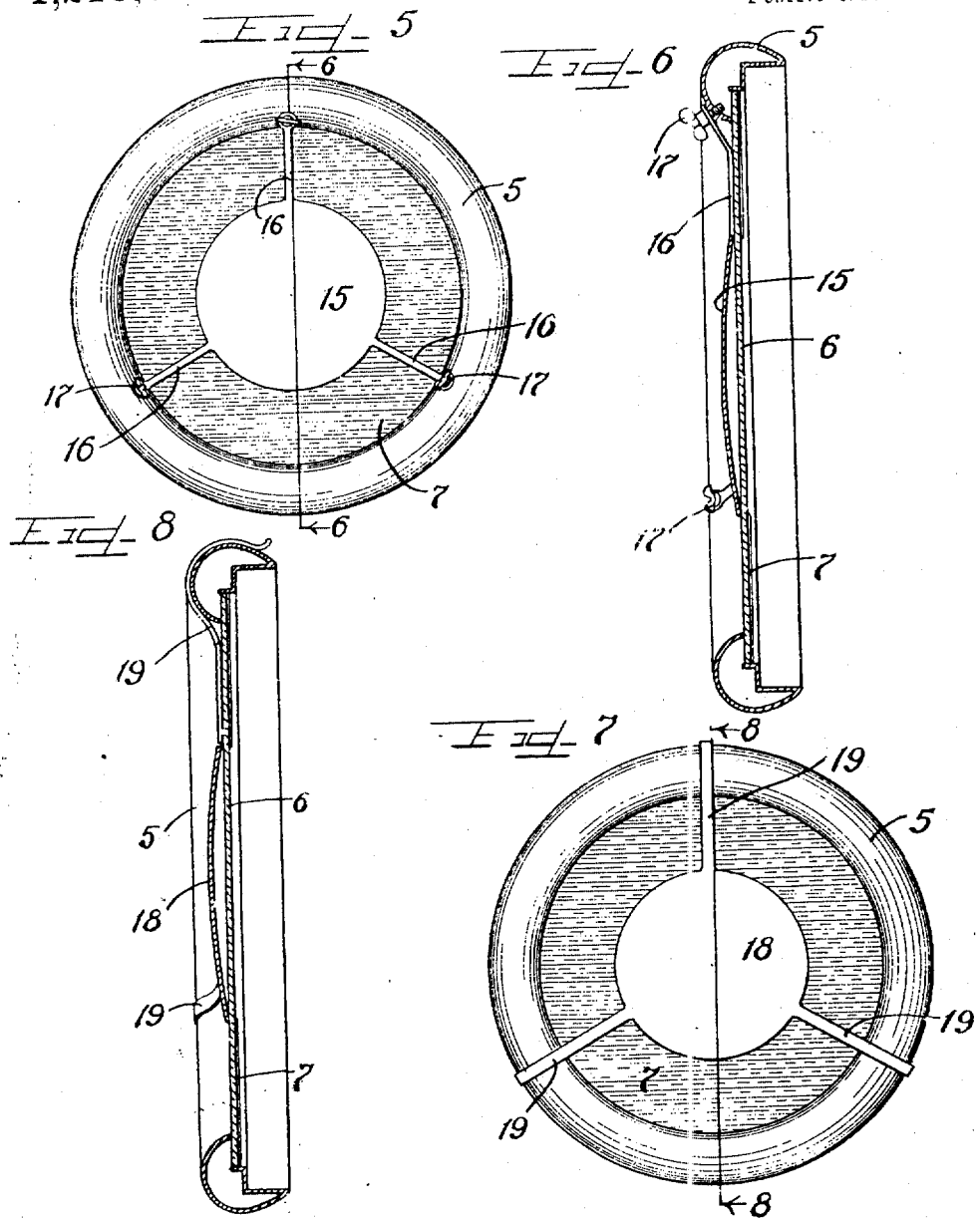

UNITED STATES PATENT OFFICE.

WARD SUMNER PERRY, OF CHICAGO, ILLINOIS

HEADLIGHT-DIMMER.

1,219,583.　　　　Specification of Letters Patent.　　Patented Mar. 20, 1917.

Application filed July 13, 1914. Serial No. 850,613.

*To all whom it may concern:*

Be it known that I, WARD S. PERRY, a citizen of the United States, and a resident of the city of Chicago, in the county of Cook and State of Illinois, have invented certain new and useful Improvements in Headlight-Dimmers; and I do hereby declare that the following is a full, clear, and exact description of the same, reference being had to the accompanying drawings, and to the numerals of reference marked thereon, which form a part of this specification.

Ordinances have been passed in many cities against the use of powerful headlights on automobiles or other vehicles, which, due to the intensity of the beam of light thrown therefrom, serve to blind and confuse pedestrians or other persons coming within range of the beam. A number of devices have been placed upon the market with the object, when attached upon the headlight, of dimming or decreasing the intensity thereof for use upon city streets, and yet permitting adjustment for use in the open country where the full effect of the light is desired. However, the objection to such devices has been largely due to their unsightly appearance, and the general disapproval of the public for anything pertaining to, or in the way of, an attachment or fixture, which, upon an automobile, usually detracts from the appearance thereof. This invention, however, affords a very neat and compact, and in fact ornamental arrangement of parts which act most efficiently to perform the purpose, acting entirely to obviate any glare whatsoever, and yet permitting sufficient light to be cast ahead for use in city driving. The construction is also particularly well adapted for use on country roads when a part of the device is removed, causing a part of the light to be cast on the road closely in front of the machine as well as the long penetrating beam for the discernment of more distant objects.

It is an object of this invention to construct a headlight embracing a lens wherein a portion of the glass is clear and the rest is translucent glass, preferably sandblast, and with a reflecting member adapted to be connected directly in the path of the axial beam through the clear glass portion of the headlight to reflect the rays inwardly again into the headlight and permit reflection thereof again through the translucent glass portion of the lens or the same may be non-reflecting.

It is also an object of this invention to construct a device wherein means are provided for attaching an opaque or semi-opaque disk centrally on the lens of a headlight to cut off the powerful central rays therefrom and permit exit only of rays through the ring of translucent glass around said disk.

It is also an object of this invention to construct a headlight provided with a lens having an annulus of ground translucent glass and with a disk attachable on said lens and extending to the inner boundaries of said translucent glass portion of the lens to cut off the central rays of light and permit exit of light only through the translucent portion.

It is furthermore an important object of this invention to construct a device attachable and detachable to and from the lens of a headlight to cut off the direct rays of light therefrom.

It is finally an object of this invention to provide a device simple and neat in construction acting to cut off the intense central rays of light from a headlight and affording the novel appearance of merely an illuminated ring when in use.

The invention (in a preferred form) is illustrated in the drawings and hereinafter more fully described.

In the drawings:

Figure 1 is a front elevation of a headlight with my device attached thereon and in use.

Fig. 2 is a similar view with the disk removed.

Fig. 3 is a section taken on line 3—3 of Fig. 1.

Fig. 4 is a side elevation of the headlight partly broken away to show the construction.

Fig. 5 is a view in elevation of the front portion of a headlight showing a modified form of dimming attachment thereon.

Fig. 6 is a section on line 6—6 of Fig. 5.

Fig. 7 is another front elevation of a portion of a headlight showing another modified form of dimming attachment thereon.

Fig. 8 is a section on line 8—8 of Fig. 7.

As shown in the drawings:

Of course my device is adaptable to any type of headlight, either gas, oil or electric, but for convenience of illustration I have shown the same attached to an electric headlight, the outer casing of which is denoted by the reference numeral 1, and mounted within which is a parabolic reflector 2. An electric bulb 3, is mounted at the proper point within the parabolic reflector 2, and the lead wires therefrom are secured in a suitable connector or plug 4, on the lower rear part of the exterior of the casing 1. A lens ring 5, is hingedly connected or in any other suitable manner desired, upon the casing 1, and rigidly supported therein is a lens or light of glass 6. Said lens or light of glass 6, has an annulus of translucent glass 7, so that only a central circular aperture of clear glass is provided for the emission of the main beam or rays of the light. A resilient disk, either opaque or semi-opaque, as desired, and of a size to completely cover the clear portion of the lens, is provided. This disk may be of metal highly polished and of such shape on its inner surface to reflect the central rays of the light inwardly upon the parabolic reflector 2, whereby they may again be reflected through the ground glass portion 7, of the lens in a diffused state.

For the purpose of maintaining said disk 8, in position upon the glass a screw 9, is secured through an aperture in the glass having suitable washers 10, one inserted beneath the head of the screw on one side of the glass and another beneath a clamping nut 11, on the other side thereof, so that the disk 8, may be inserted over the end of the screw and secured tightly thereon by a small knurled nut 12.

As clearly illustrated in Fig. 3, I have also shown thin resilient metallic washers 13 and 14, one disposed between the head of the screw and the fiber washer 10, and the other between the nut 11, and the other fiber washer 10, and of course if desired all of said washers and said screw and nut 11, may be coated with a cement after being drawn up in order to insure positive and permanent engagement of the screw 9, in the glass.

In the modification of my invention illustrated in Figs. 5 and 6, I have shown a disk 15, provided with attaching arms 16, projecting radially therefrom adapted to receive thumb screws 17, therethrough, said thumb screws threading into the ring 5, of the headlight to hold the device securely in position.

In the modification illustrated in Figs. 7 and 8, a disk 18, is provided, having integral arms 19, which engage resiliently over the rounded ring 5, of the headlight to hold the device securely in position.

The operation is thought to be obvious from the description. However, the curvature of the disk enables the same to be secured yieldably upon the glass 6, of the headlight without a tendency to break the same or to rattle; of course when used as a reflector the direct central rays from the headlight are reflected back upon the parabolic reflector 2, and then projected through the ground glass portion 7, of the lens in a diffused condition without any objectionable glaring effect.

Of course it is obvious that the shield or disk in any case may be of any suitable material, and may be either opaque or semi-opaque as desired, and that numerous other details may be varied through a wide range without departing from the principles of this invention. I therefore do not purpose limiting the patent granted otherwise than necessitated by the prior art.

I claim as my invention:

1. In a device of the class described the combination with the lens of a headlight, said lens having a translucent portion and a clear portion, of means attachable over the clear portion of the lens to cut off the rays of light therethrough.

2. In a device of the class described for use on a headlight the combination with an integral translucent and transparent lens, of means adapted to be secured over the transparent portion of said lens to reflect rays of light directed thereon back upon the main reflector of the headlight to be projected through the translucent portion of the lens.

3. The combination with a headlight having a lens with an annulus of translucent glass, of means adapted to be secured over the lens within the clear glass area bounded by said translucent glass portion to reflect rays of light passing therethrough back into the headlight to be projected through said translucent glass portion in a diffused state.

4. In a device of the class described a means adapted to be secured on a clear and translucent lens of a headlight to cut off the rays of light emitted from the clear portion of said headlight.

5. In a device of the class described a headlight, a lens thereon, said lens having a translucent and a clear portion, a screen for covering said clear portion to cut off the rays of light normally emitted therethrough from the headlight, and means for removably securing said screen on said lens.

6. A headlight having a partly clear and partly translucent lens and means removably secured thereon for screening the clear glass portion of the lens.

In testimony whereof I have hereunto subscribed my name in the presence of two subscribing witnesses.

WARD SUMNER PERRY.

Witnesses:
 LEON M. RUBSTEIN,
 CHARLES W. HILLS, Jr.